(12) United States Patent
Frick et al.

(10) Patent No.: US 10,495,728 B2
(45) Date of Patent: Dec. 3, 2019

(54) SIGNAL INTERFERENCE PREVENTION SYSTEM FOR A FREQUENCY-MODULATED CONTINUOUS WAVE RADAR ALTIMETER

(71) Applicant: Honeywell International Inc., Morris Plains, NJ (US)

(72) Inventors: Seth T. Frick, Saint Paul, MN (US); Benjamin J. Winstead, South Burlington, VT (US)

(73) Assignee: Honeywell International Inc., Morris Plains, NJ (US)

( * ) Notice: Subject to any disclaimer, the term of this patent is extended or adjusted under 35 U.S.C. 154(b) by 271 days.

(21) Appl. No.: 15/451,336

(22) Filed: Mar. 6, 2017

(65) Prior Publication Data
US 2018/0252797 A1   Sep. 6, 2018

(51) Int. Cl.
*G01S 7/02* (2006.01)
*G01S 13/88* (2006.01)
*G01S 13/34* (2006.01)

(52) U.S. Cl.
CPC ............ *G01S 7/023* (2013.01); *G01S 13/343* (2013.01); *G01S 13/345* (2013.01); *G01S 13/882* (2013.01)

(58) Field of Classification Search
CPC .............................. G01S 7/023; G01S 13/343
USPC ................................................. 342/120–122
See application file for complete search history.

(56) References Cited

U.S. PATENT DOCUMENTS

| | | | |
|---|---|---|---|
| 5,347,283 A | | 9/1994 | Krizek et al. |
| 5,361,070 A | * | 11/1994 | McEwan ............ A61B 5/0507 342/21 |
| 9,772,397 B1 | * | 9/2017 | Bordes .................... G01S 7/023 |
| 2003/0001772 A1 | * | 1/2003 | Woodington ...... B60K 31/0008 342/70 |
| 2004/0130482 A1 | * | 7/2004 | Lin ......................... G01S 7/023 342/82 |
| 2009/0021418 A1 | * | 1/2009 | Winstead .............. G01S 7/4021 342/91 |

(Continued)

FOREIGN PATENT DOCUMENTS

| | | |
|---|---|---|
| EP | 2006709 A1 | 12/2008 |
| EP | 2653887 A1 | 10/2013 |
| WO | 2017177972 A1 | 10/2017 |

OTHER PUBLICATIONS

Luo et al., "A 77-GHz CMOS Automotive Radar Transceiver With Anti-Interference Function", "IEEE Transactions on Circuits and Systems—I: Regular Papers", Dec. 2013, pp. 3247-3255, vol. 60, No. 12, Publisher: IEEE.

(Continued)

*Primary Examiner* — Marcus E Windrich
(74) *Attorney, Agent, or Firm* — Fogg & Powers LLC (57) ABSTRACT

Systems and methods of operating an interference prevention system in a radar altimeter are provided. A method includes generating integer values with at least one pseudorandom noise sequence generator. The generated integer values are used as indexes to select at least one of start frequencies and stop frequencies from at least one frequency table for frequency modulated continuous wave (FMCW) ramps for a generated radar signal. The selected at least one of the start frequencies and the stop frequencies is provided to a frequency synthesizer. The at least one of start frequencies and the stop frequencies are used in generating transmit frames of the radar signal with the frequency synthesizer.

18 Claims, 3 Drawing Sheets

(56) References Cited

U.S. PATENT DOCUMENTS

| | | | |
|---|---|---|---|
| 2010/0245154 A1* | 9/2010 | Szajnowski | G01S 7/023 342/90 |
| 2011/0037642 A1 | 2/2011 | Stove | |
| 2011/0291875 A1* | 12/2011 | Szajnowski | G01S 7/023 342/70 |
| 2015/0084808 A1* | 3/2015 | Vacanti | G01S 7/41 342/122 |
| 2017/0023662 A1* | 1/2017 | Ding | G01S 7/023 |
| 2017/0131394 A1* | 5/2017 | Roger | G01S 7/023 |

OTHER PUBLICATIONS

European Patent Office, "Extended European Search Report from EP Application No. 18160054.5 dated Jul. 5, 2018", "from Foreign Counterpart of U.S. Appl. No. 15/451,336", filed Jul. 5, 2018, pp. 1-10, Published in: EP.

\* cited by examiner

SIGNAL INTERFERENCE PREVENTION SYSTEM FOR A FREQUENCY-MODULATED CONTINUOUS WAVE RADAR ALTIMETER

BACKGROUND

Successful operation of a radar altimeter requires that the device is able to detect and track the reflected return of its own transmitted radio frequency (RF) signal, without being negatively impacted by interference signals in the same RF band. This in-band interference may cause the victim altimeter to track the false signals and report erroneous altitudes, or to lose track of its own signal and "break lock." Both of these failure modes are problematic, and in safety-critical applications such as final approach guidance or terrain avoidance, they are highly dangerous as well. The most common sources of in-band interference signals are other radar altimeters. In certain applications, multiple radar altimeters of the same type may be installed on the same aircraft for redundancy, leading to potential issues of mutual interference between the devices. In addition, the radar altimeters installed on other aircraft, which may be of the same type or a different type, may pose a threat under certain circumstances, especially in high-traffic airspace such as in the immediate vicinity of busy airports.

Many known techniques exist to prevent radar altimeters from tracking false signals from other altimeters of a different type. In the case of frequency-modulated continuous wave (FMCW) radar altimeters, which represent a majority of the altimeters used in commercial applications, selecting a sweep rate sufficiently different from those used by other altimeter products may be enough to suitably limit the susceptibility to interference from these other products. The issue of mutual interference between altimeters of the same type, however, is often a more difficult problem to solve. Addressing this issue may require more subtle or sophisticated methods to reduce interference susceptibility and mitigate the impact of interference.

For the reasons stated above and for other reasons stated below which will become apparent to those skilled in the art upon reading and understanding the present specification, there is a need in the art for a system that efficiently and effectively prevents interference in a radar altimeter.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. Embodiments implement at least one pseudorandom noise sequence generator to generate an integer value that is used as an index to at least one of start and stop frequency values stored in a frequency table. A radar signal is generated with transmit frames that are each formed based on a then current indexed start or stop frequency value.

In one embodiment, a signal interference prevention system for a frequency modulated continuous wave (FMCW) radar altimeter is provided. The signal interference prevention system includes a frequency synthesizer, at least one memory and a field-programmable gate array (FPGA). The frequency synthesizer is used to generate FMCW ramps in a radio frequency (RF) signal used in the FMCW radar altimeter. A ramp rate of the frequency synthesizer is fixed to provide a constant radar range of resolution. A transmit frame time of the frequency synthesizer is fixed to provide simplified signal processing in the FMCW radar altimeter. At least one frequency table is stored in the at least one memory. The FPGA is configured to implement at least one pseudorandom noise sequence generator to generate an integer value that is used as an index into the at least one frequency table in selecting a start frequency of the FMCW ramp for a current frame of the radio frequency (RF) signal. The FPGA is further configured to use a start frequency of a next transmit frame as a stop frequency. Moreover, the at least one pseudorandom noise sequence generator is clocked one frame ahead of the frequency synthesizer so that the start and stop frequency may be configured at the beginning of each frame.

In another embodiment, a radar altimeter with an interference prevention system is provided. The radar altimeter includes at least one antenna, a transmitter, a receiver, a signal processor and a signal generator. The at least one antenna is used to transmit and receive frequency modulated signals. The transmitter and the receiver are in communication with the at least one antenna. The signal processor is in communication with the receiver. The signal processor is configured to process received signals to determine ranging information. The signal generator is configured to generate the frequency modulated signals. The signal generator is in communication with the at least one transmitter. The signal generator includes at least one pseudorandom noise sequence generator, at least one memory, at least one frequency synthesizer and at least one controller. The at least one pseudorandom noise sequence generator is configured to generate integer values from a fixed time base signal. The at least one memory is configured to store at least one of start frequencies and stop frequencies. The frequency synthesizer is configured to generate frequency modulated continuous wave (FMCW) ramps in transmit frames of the frequency modulated signal. The at least one controller is configured to use the generated integer values from the at least one pseudorandom noise sequence generator as indexes to the at least one of start frequencies and stop frequencies stored in the at least one memory. The controller is further configured to cause the frequency synthesizer to generate the FMCW ramps based on the at least one of the start frequencies and stop frequencies indexed from the at least one memory.

In yet another embodiment, a method of operating an interference prevention system in a radar altimeter is provided. The method includes generating integer values with at least one pseudorandom noise sequence generator. The generated integer values are used as indexes to select at least one of start frequencies and stop frequencies from at least one frequency table for frequency modulated continuous wave (FMCW) ramps for a generated radar signal. The selected at least one of the start frequencies and the stop frequencies is provided to a frequency synthesizer. The at least one of start frequencies and the stop frequencies are used in generating transmit frames of the radar signal with the frequency synthesizer.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a system that pseudorandomly varies parameters of frequency-modulated continuous wave (FMCW) ramps, either by changing the timing of the ramps or the frequencies of the ramps. Unique aspects of embodiments, as well as the technical and business benefits, lie in the specific implementation of ramp dither via pseudorandom frequency selection. Embodiments provide nearly optimal mutual interference performance for the Single Antenna Radar Altimeter (SARA), with only very minimal impact to the design of both the device hardware and software. Although the implementation is specific to SARA, the methods are easily applicable to other FMCW radar altimeters. This low-impact solution is realized in an embodiment, since the ramp dither is implemented entirely in the RF field-programmable gate array (FPGA) which controls the frequency synthesizer to set the parameters of each FMCW ramp. Further, limiting the implementation to this single component in an embodiment allows excellent interference rejection performance without any specialized hardware or software, reducing design effort and cost.

Figure 1:
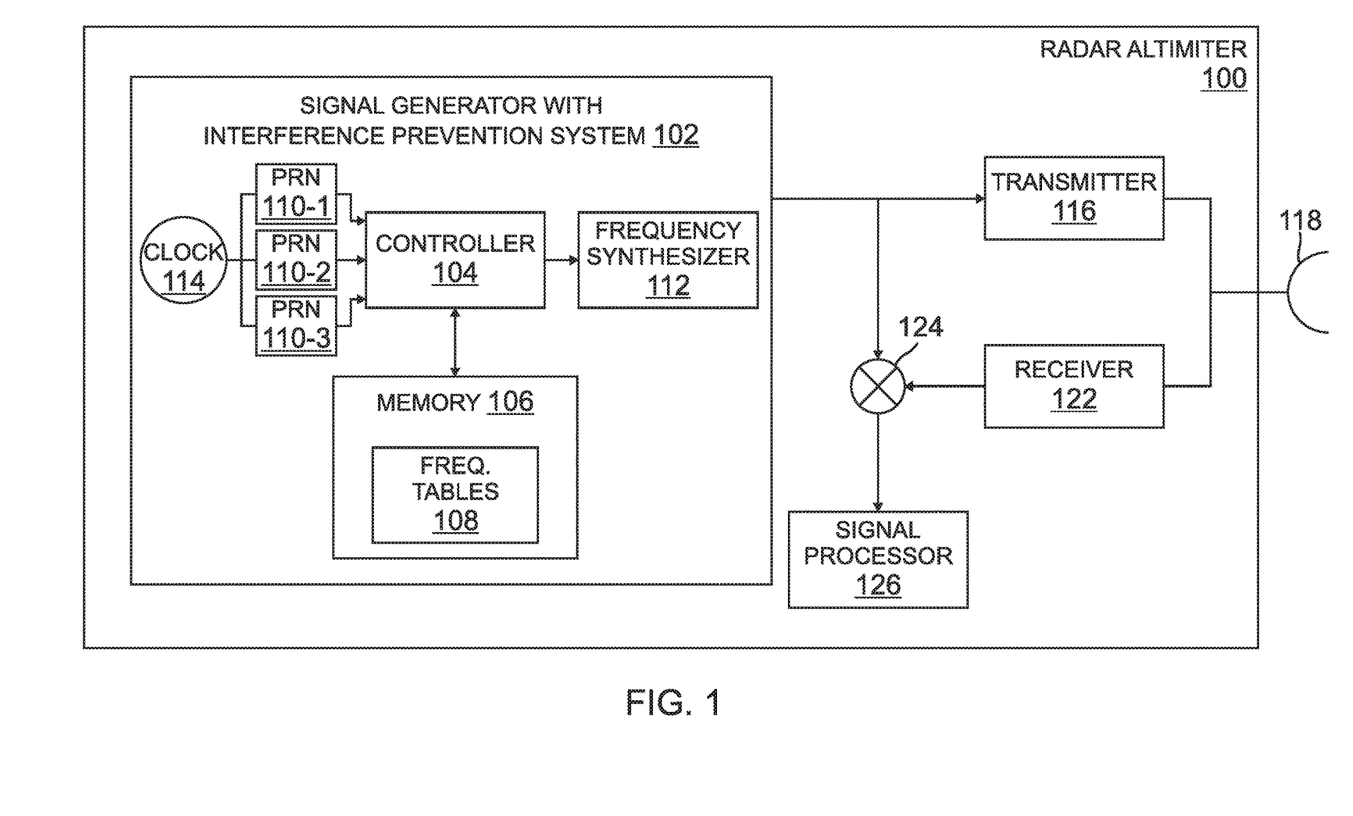
FIG. 1 is a block diagram of a radar altimeter of an embodiment.

Referring to FIG. 1 a simplified FMCW radar altimeter 100 block diagram is illustrated including a signal generator with signal interference prevention system 102 of an embodiment. The signal generator with signal interference prevention system 102 provides a radio frequency (RF) signal used by the radar altimeter 100. The radar altimeter 100 further include transmitter 116 that transmits the radar signal from the signal generator with signal interference prevention system 102 via antenna 118. A reflected radar return signal is received back through antenna 118 and receiver 122. The reflected radar return signal is combined with a sample of the generated radar signal from the signal generator with signal interference prevention system 102 at mixer 124. The combined signal is provided to a signal processor 126 that provides ranging results based on reflected radar return signals and the generated radar signals from the signal generator with signal interference prevention system 102. Although only one antenna 118 is illustrated in FIG. 1, other embodiments may include a separate transmit antenna and a receive antenna.

The signal generator with signal interference prevention system 102 includes a frequency synthesizer 112. In embodiments, frequency synthesizer 112 generates FMCW ramps in transmit frames under the control of controller 104 to generate the radar signal. A ramp rate of the frequency synthesizer 112 may be fixed to provide a constant range resolution. Moreover, a transmit frame time of the frequency synthesizer 112 may be fixed to provide simplified signal processing in the signal processor 126 of the radar altimeter 100. The signal generator with signal interference prevention system 102 further includes at least one pseudorandom noise (PRN) sequence generator (generally designated as 110), which in this example embodiment includes three PRN sequence generators 110-1 through 110-3 which are in communication with a clock 114 to receive a fixed time base signal. Also included in the signal generator with signal interference prevention system 102 is a memory 106. Stored within the memory 106 are frequency tables 108. The frequency tables 108, as discussed below in detail, include at least one of start frequencies and stop frequencies.

In general, the controller 104 may include any one or more of a processor, microprocessor, a digital signal processor (DSP), an application specific integrated circuit (ASIC), a field-programmable gate array (FPGA), or equivalent discrete or integrated logic circuitry. In some example embodiments, controller 104 may include multiple components, such as any combination of one or more microprocessors, one or more controllers, one or more DSPs, one or more ASICs, one or more FPGAs, as well as other discrete or integrated logic circuitry. Embodiments using at least one FPGA 104 are particularly efficient in that linear feedback shift registers of the FPGA 104 can be implemented resulting in a minimal use of resources as mentioned above. Also, the frequency tables 108 may contain only a few elements in some embodiments and thus can be stored directly in the FPGA 104 fabric rather than an external memory. The functions attributed to the controller 104 herein may be embodied as software, firmware, hardware or any combination thereof. The controller may be part of a system controller or a component controller. The memory 106 may include computer-readable operating instructions that, when executed by the controller 104 provide functions of the signal generator. Such functions may include the functions of the signal generator with signal interference prevention system 102 described below. The computer readable instructions may be encoded within the memory. Memory 106 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

As briefly discussed above, the frequency tables 108 includes at least one of a plurality of FMCW start or stop frequencies. For example, a pre-configured table of 16 possible FMCW ramp stop frequencies (8 up ramp stop frequencies, and 8 down ramp stop frequencies) is used in an embodiment. Other embodiment may use start ramp start frequencies. The table may be stored in nonvolatile memory or may be hard-coded into registers on the FPGA 102 as discussed above. In an embodiment, a small size of the table contributes to the low implementation costs. The target tracking and altitude determination algorithms in most FMCW altimeters require that a frequency offset between the transmitted and received signals persist within a narrow frequency range for an extended period of time before the received signal is considered a valid altitude target. For example, the offset may be required to remain within 1 to 3 kHz range for at least 14 out of 40 transmit frames, where each frame is about 1 millisecond. Because of this requirement, start values in the frequency table 108 may be selected to provide much larger variations in victim-to-interferer frequency offset from frame to frame (tens or hundreds of kHz). The frequencies are also chosen such that frequency offsets can only persist within the required range if the same sequence is followed through the table by both the victim and the interferer.

At the beginning of each transmit frame, the controller 104 configures the frequency synthesizer to execute an FMCW ramp. The ramp rate (linear slope) may be fixed to provide a constant range resolution, so the only parameters needed to fully define each ramp are the start and stop frequencies. These stop and start frequencies are pseudo-randomly selected for each ramp from the frequency tables 108, using, in one embodiment, three PRN sequence generators 110-1 through 110-3, which are easily implemented in the FPGA embodiment using 18-bit linear-feedback shift registers (LFSRs). In an embodiment, each PRN sequence generator 110 produces a maximal length sequence at its output, and is configured with a different feedback polynomial and seed value to prevent correlations across the three sequences. The PRN sequence generators 110 are clocked based on the timing of the transmit frames, such that one output bit is produced from each PRN sequence generator 110 in each frame. The three output bits from the PRN sequence generators 110-1 through 110-3 are combined to form a single 3-bit integer value, ranging from 0 to 7 (8 possible values). This value is taken as an index into the frequency tables 108 to select at least one of start and stop frequencies of the ramp for the current frame. The ramp direction simply toggles between up and down on each transmit frame, so only 8 possible index values are needed, rather than 16.

In an embodiment, the stop frequency of the ramp on each transmit frame is simply the start frequency of the next transmit frame, so the PRN sequence generators 110 are clocked one frame ahead of the frequency synthesizer, so that both the start and stop frequency may be configured at the beginning of each frame. The use of the PRN sequence generators 110 allows for a very long sequence of start frequencies, without having to store the full sequence. The correlation properties of the PRN sequences, and the spacing between the values in the frequency table 108, provide great improvements in interference rejection performance by continuously and pseudorandomly varying the victim-to-interferer frequency offset. This causes potential false targets from interferers to move throughout the victim's frequency band in a manner that is not consistent with a physical altitude target, causing the interference targets to be ignored by the standard tracking and altitude determination algorithms without any modifications.

Figure 2:
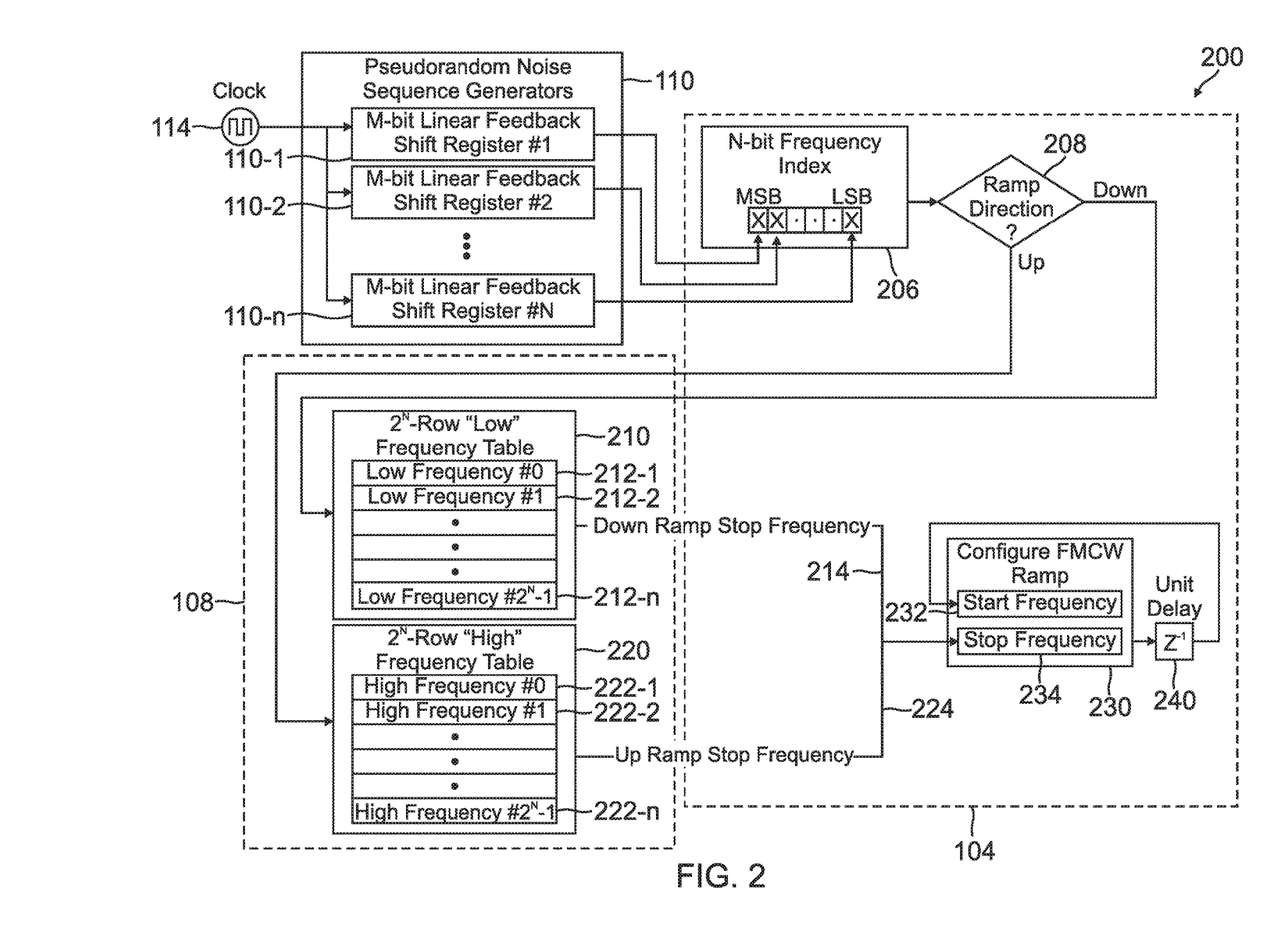
FIG. 2 is an illustration of a signal interference prevention signal generation flow diagram of an embodiment.

Referring to FIG. 2, a signal interference prevention signal generation flow diagram 200 of one embodiment is illustrated. As illustrated, the process starts with the clock 114 providing the fixed time base signal to the PRN sequence generators 110. As illustrated, any number of PRN sequence generators 110-1, 110-2 through 110-N can be used depending on the number of bits used in the frequency index 206. Each PRN sequence generator 110, in an embodiment, may be an M-bit linear feedback shift register. Moreover, each linear feedback shift register may have a unique maximum length sequence feedback polynomial. An output of the N-bit frequency index 206 is provided to a ramp direction logic block 208 implemented by the controller 208. If the ramp direction is to be in an up ramp direction a $2^N$ row high frequency table 220 is used. If the ramp direction is to be in a down ramp direction a $2^N$ row low frequency table 210 is used. The up ramp direction refers to a positive FMCW slope and the down ramp direction refers to a negative FMCW slope. The $2^N$ row high frequency table 220 includes high frequencies 222-1 through 222-$2^N$-1. The $2^N$ row low frequency table 210 includes low frequencies 212-1 through 212-$2^N$-1. The selected up ramp stop frequency or down ramp stop frequency is provided to a configure FMCW ramp block 230 implemented by the controller 104. The configure FMCW ramp block 230 provides that a previous ramp stop frequency 234 is a current ramp start frequency 232. Either the up ramp stop frequency or down ramp stop frequency is used for the stop frequency 234. In this example embodiment, the stop frequency 234 of the FMCW ramp is provided to a unit delay $Z^{-1}$ 240. After the unit delay 240, the start frequency 232 of the FMCW ramp is provided to configure the FMCW ramp. The FMCW ramp is provided to the frequency synthesizer 116 to generate the output signal of the radar altimeter 100. In embodiments, a FMCW ramp dither sequence length of $2^M$-1 may be achieved with only $2^{N+1}$ stored frequencies. The $2^{N+1}$ frequencies may be stored in two tables: 2 N high frequencies and 2 N low frequencies.

Figure 3:
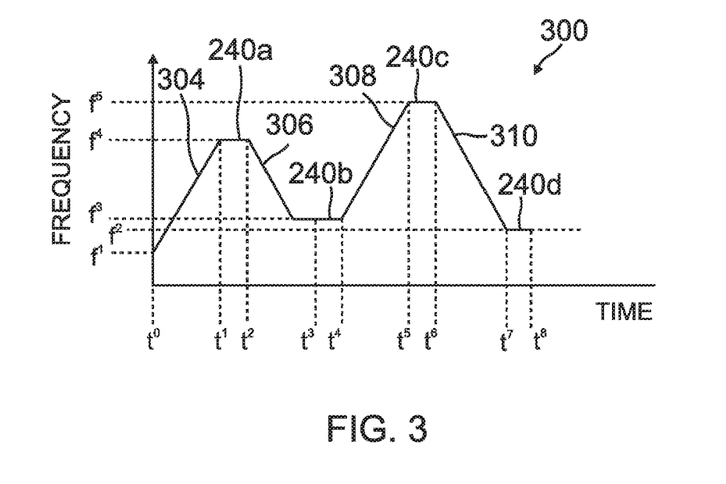
FIG. 3 is an illustration of a partial wave form of a radar signal of an embodiment.

Referring to FIG. 3 a partial generated radar signal in a frequency generating graph 300 of FIG. 3 is illustrated. In an embodiment, an initial start frequency $f^1$ is selected with PRN sequence generator seed values. In the example illustration, from the initial start frequency $f^1$, an up ramp 304 in a transmit frame of the radar signal is created until an up ramp stop frequency $f^4$ is reached at $t^1$. As discussed above, the up ramp stop frequency $f^4$ is provided by the high frequency table 220 which is indexed by the PRN sequence generators 110. Varied turnaround times 240a, 240b, 240c 240d are used to allow the total transmit frame time for each frame to be equal. The radar signal remains at the stop frequency $f^4$ until the total transmit frame time is reached at $t^2$. To simplify the reception and processing of the radar signal, this transmit frame time $(t^2-t^0)$ is constant for all frames, even as the ramp time varies due to the different ramp start and stop frequencies. Thus the times $(t^2-t^0)$, $(t^4-t^2)$, $(t^6-t^4)$ and $(t^8-t^6)$ are all equal. It is therefore necessary that the constant transmit frame time be at least as long as the longest possible ramp time based on the fixed FMCW ramp rate and the values in the high and low frequency tables. The stop frequency $f^4$ of the up ramp 304 is the same as the start frequency $f^4$ of the down ramp 306 in this example embodiment. A down ramp stop frequency $f^3$ is reached at $t^3$ and is maintained until $t^4$. At $t^4$ an up ramp 308 of a next transmit frame is started that ends at an up ramp stop frequency $f^5$ at $t^5$. At $t^6$, a down ramp 310 is started until a down ramp stop frequency $f^2$ is reached. The process continues this way to creating transmit frames of the radar signal for the radar altimeter 100. As discussed above, in embodiments the up ramps 304 and 308 and the down ramps 306 and 310 may have the same ramp rate (linear slope) to provide a constant range resolution. Hence in theses embodiments only the start and stop frequencies, which are pseudorandomly generated, need to determined.

As discussed and illustrated relating to the embodiment illustrated in FIG. 3, for any given transmit frame (i.e. for each clock cycle of the PRN sequence generators 110), the frequency selected from the frequency tables 108 is based on the output index of the PRN sequence generators 110 and will correspond to the "stop" frequency of the current ramp. However, this "stop" frequency is also the "start" frequency of the next ramp, so frequency tables may be referred to as either start frequency tables or stop frequency tables. Frequencies at the lower end of the band will be "start"

frequencies for up ramps and "stop" frequencies for down ramps, while frequencies at the upper end of the band will be "stop" frequencies for up ramps and "start" frequencies for down ramps. In general, the start and stop frequency indices in a transmit frame k are defined recursively as:

$$\text{Start Frequency } Index_k = \begin{cases} \text{Index From } PRN \text{ Seeds} & k = 0 \\ \text{Stop Frequency } Index_{k-1}, & k > 0 \end{cases}$$

$$\text{Stop Frequency } Index_k = \text{Index From } PRN \text{ Outputs}_k, k \geq 0$$

In some embodiments, the PRN sequence generators 110 are clocked synchronously with, but at least one clock cycle ahead of, the transmit frame timing. This ensures that the system generates both a start frequency and a stop frequency for each ramp. This means that for the first transmit frame after the device powers up (k=0), the PRN sequence generators 110 are all clocked once to generate a stop frequency index. A start frequency index in this frame is obtained from the PRN seed values (i.e. the PRN sequence generators output, before any clocking has begun). All subsequent frames use the previous frame stop frequency for the current start frequency, and obtain the current stop frequency from the PRN sequence generator outputs.

Figure 4:
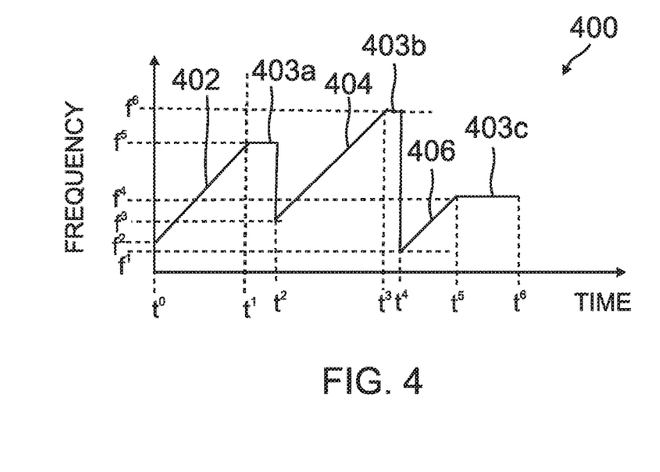
FIG. 4 is an illustration of a partial wave form of a radar signal of another embodiment.

FIG. 3 and the discussion above apply the PRN sequence generators on a triangle FMCW waveform which has both up and down ramp directions. This technique may also be applied to sawtooth FMCW (which uses just one ramp direction). In this embodiment two separate frequency tables may be used: one table for start frequencies and one for stop frequencies. An example of a partial created sawtooth FMCW waveform 400 is illustrated in FIG. 4. Similar to the embodiment illustrated in FIG. 3, this embodiment employs varied turnaround times 403*a*, 403*b* and 403*d* to allow the total transmit frame time for each frame to be equal. To simplify the reception and processing of the radar signal, this transmit frame time ($t^2$-$t^0$) is constant for all frames, even as the ramp time varies due to the different ramp start and stop frequencies. Thus the times ($t^2$-$t^0$), ($t^4$-$t^2$) and ($t^6$-$t^4$) are all equal. In this example, a PRN seed value may be used to index a start frequency $f^2$ of ramp 402 at $t^0$. A stop frequency $f^5$ is provided by a stop frequency table which is indexed from the PRN sequence generators. The stop frequency $f^5$ is reached at $t^1$. The next up ramp 404 starts at frequency $f^3$ which is provided from a start frequency table. In the example, embodiment of the FIG. 4, the next ramp up 404 starts at $t^2$ after the turnaround time 403*a*. Up ramp 404 stops at frequency $f^6$ at $t^3$. At $t^4$, after turnaround time 403*b*, the next up ramp 406 starts at frequency $f^1$ provided by the start ramp table. This process continues creating the transmit frames of a signal for the radar altimeter 100. Hence, in this embodiment, a same index frequency value generated by the PRN sequence generators may be used that corresponds to different frequencies for the stop and start of the up ramps. For example, please see the end of up ramp 402 at frequency $f^5$ and the start of the next up ramp 404 at frequency $f^3$ illustrated in FIG. 4. The ramp rate of ramps 402, 404 and 406 in this embodiment may also be fixed to provide a constant radar range resolution.

Example Embodiments

Example 1 is a signal interference prevention system for a frequency modulated continuous wave (FMCW) radar altimeter. The signal interference prevention system includes a frequency synthesizer, at least one memory and a field-programmable gate array (FPGA). The frequency synthesizer is used to generate FMCW ramps in a radio frequency (RF) signal used in the FMCW radar altimeter. A ramp rate of the frequency synthesizer is fixed to provide a constant radar range resolution. A transmit frame time of the frequency synthesizer is fixed to provide simplified signal processing in a signal processor of the FMCW radar altimeter. At least one frequency table is stored in the at least one memory. The FPGA is configured to implement at least one pseudorandom noise sequence generator to generate an integer value that is used as an index into the at least one frequency table in selecting a start frequency of the FMCW ramp for a current frame of the radio frequency (RF) signal. The FPGA is further configured to use a start frequency of a next transmit frame as a stop frequency. Moreover, the at least one pseudorandom noise sequence generator is clocked one frame ahead of the frequency synthesizer so that the start and stop frequency may be configured at the beginning of each frame.

Example 2 includes the aspects of the signal interference prevention system of Example 1, wherein the at least one pseudorandom noise sequence generator further includes three pseudorandom noise sequence generators. Each pseudorandom noise sequence generator has its own feedback polynomial and seed value. Each pseudorandom noise sequence generator is configured to output a maximum length sequence. The FPGA is configured to combine the outputs of the three pseudorandom noise sequence generators to determine the integer value that is used as the index into the frequency table.

Example 3 includes the aspects of the signal interference prevention system any of the Examples 1-2, wherein the duration of the FMCW ramps is modulated by the start and stop frequencies selected by the at least one pseudorandom noise sequence generator therein causing dithering of the effective pulse repetition interval (PRI) of the FMCW radar altimeter without any variation of the transmit frame time of the FMCW radar altimeter.

Example 4 includes the aspects of the signal interference prevention system any of the Examples 1-3, further including a clock in communication with the at least one pseudorandom noise sequence generator to provide a fixed time base signal to the at least one pseudorandom noise sequence generator.

Example 5 includes the aspects of the signal interference prevention system of any of the Examples 1-4, wherein the at least one memory storing the at least one frequency table includes registers of the FPGA.

Example 6 includes the aspects of the signal interference prevention system any of the Examples 1-5, wherein the at least one frequency table includes a low frequency table that includes down ramp stop frequencies and a high frequency table that includes up ramp stop frequencies.

Example 7 is a radar altimeter with an interference prevention system. The radar altimeter includes at least one antenna, a transmitter, a receiver, a signal processor and a signal generator. The at least one antenna is used to transmit and receive frequency modulated signals. The transmitter and the receiver are in communication with the at least one antenna. The signal processor is in communication with the receiver. The signal processor is configured to process received signals to determine ranging information. The signal generator is configured to generate the frequency modulated signals. The signal generator is in communication with the at least one transmitter. The signal generator includes at least one pseudorandom noise sequence generator, at least one memory, at least one frequency synthesizer and at least one controller. The at least one pseudorandom noise sequence generator is configured to generate integer values from a fixed time base signal. The at least one memory is configured to store at least one of start frequencies and stop frequencies. The frequency synthesizer is configured to generate frequency modulated continuous wave (FMCW) ramps in transmit frames of the frequency modulated signal. The at least one controller is configured to use the generated integer values from the at least one pseudorandom noise sequence generator as indexes into the at least one of start frequencies and stop frequencies stored in the at least one memory. The controller is further configured to cause the frequency synthesizer to generate the FMCW ramps based on the at least one of the start frequencies and stop frequencies indexed from the at least one memory.

Example 8 includes the aspects of the radar altimeter of Example 7, wherein the at least one controller is at least one field-programmable gate array (FPGA).

Example 9 includes the aspects of the radar altimeter of Examples 8, wherein the at least one memory is at least one register of the FPGA.

Example 10 includes the aspects of the radar altimeter any of the Examples, wherein each pseudorandom noise sequence generator has its own feedback polynomial and seed value.

Example 11 includes the aspects of the radar altimeter any of the Examples 7-10, wherein each pseudorandom noise sequence generator is configured to output a maximum length sequence.

Example 12 includes the aspects of the radar altimeter any of the Examples 7-11, wherein the at least one pseudorandom noise sequence generator further includes three pseudorandom noise sequence generators. The controller is configured to combine the outputs of the three pseudorandom noise sequence generators to determine the integer value that is used as the index into the frequency table.

Example 13 includes the aspects of the radar altimeter any of the Examples 7-12, wherein the at least one of start frequencies and stop frequencies stored in the at least one memory are stored in a low frequency table that includes down ramp stop frequencies and a high frequency table that includes up ramp stop frequencies.

Example 14 includes a method of operating an interference prevention system in a radar altimeter. The method includes generating integer values with at least one pseudorandom noise sequence generator. The generated integer values are used as indexes to select at least one of start frequencies and stop frequencies from at least one frequency table for frequency modulated continuous wave (FMCW) ramps for a generated radar signal. The selected at least one of the start frequencies and the stop frequencies is provided to a frequency synthesizer. The at least one of start frequencies and the stop frequencies are used in generating transmit frames of the radar signal with the frequency synthesizer.

Example 15 includes the method aspects of Example 14, further including clocking the at least one pseudorandom noise sequence generator one frame ahead of the frequency synthesizer so that a start and stop frequency may be configured at the beginning of each transmit frame.

Example 16 includes the method aspects of any of the Examples 14-15, further including determining a ramp direction for a current transmit frame; using a down ramp stop frequency from the at least one frequency table when the direction of the ramp in the current transmit frame is down; and using an up ramp stop frequency from the at least one frequency table when the direction of the ramp in the current transmit frame is up.

Example 17 includes the method aspects of any of the Examples 14-16, further including using a stop frequency of a current transmit frame as a start frequency of a next transmit frame.

Example 18 includes the method aspects of Example 17, further including maintaining the frequency of the generated radar signal at a stop frequency of a current transmit frame after the completion of the ramp for the remainder of the fixed transmit frame time.

Example 19 includes the method aspects of any of the Examples 14-18, further including fixing a ramp rate of the frequency modulated continuous wave (FMCW) ramps.

Example 20 includes the method aspects of any of the Examples 14-19, wherein generating integer values with at least one pseudorandom noise sequence generator further includes generating each integer value with three pseudorandom noise sequence generators.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A signal interference prevention system for a frequency modulated continuous wave (FMCW) radar altimeter, the signal interference prevention system comprising:
    a frequency synthesizer to generate FMCW ramps in a radio frequency (RF) signal used in the FMCW radar altimeter, a ramp rate of the frequency synthesizer being fixed to provide a constant radar range resolution, a transmit frame time of the frequency synthesizer being fixed to provide simplified signal processing in the FMCW radar altimeter;
    at least one memory, at least one frequency table stored in the at least one memory; and
    a field-programmable gate array (FPGA) configured to implement at least one pseudorandom noise sequence generator to generate an integer value that is used as an index into the at least one frequency table in selecting a start frequency of the FMCW ramp for a current frame of the radio frequency (RF) signal, the FPGA further configured to use a start frequency of a next transmit frame as a stop frequency wherein the at least one pseudorandom noise sequence generator is clocked one frame ahead of the frequency synthesizer so that the start and stop frequency may be configured at the beginning of each frame.

2. The signal interference prevention system of claim 1, wherein the at least one pseudorandom noise sequence generator further comprises:
    three pseudorandom noise sequence generators, each pseudorandom noise sequence generator having its own feedback polynomial and seed value, each pseudorandom noise sequence generator configured to output a maximum length sequence, the FPGA configured to combine the outputs of the three pseudorandom noise sequence generators to determine the integer value that is used as the index into the frequency table.

3. The signal interference prevention system of claim 1, wherein the duration of the FMCW ramps is modulated by the start and stop frequencies selected by the at least one pseudorandom noise sequence generator therein causing dithering of the effective pulse repetition interval (PRI) of the FMCW radar altimeter without any variation of the transmit frame time of the FMCW radar altimeter.

4. The signal interference prevention system of claim 1, further comprising:
a clock in communication with the at least one pseudorandom noise sequence generator to provide a fixed time base signal to the at least one pseudorandom noise sequence generator.

5. The signal interference prevention system of claim 1, wherein the at least one memory storing the at least one frequency table includes registers of the FPGA.

6. The signal interference prevention system of claim 1, wherein the at least one frequency table includes a low frequency table that includes down ramp stop frequencies and a high frequency table that includes up ramp stop frequencies.

7. A radar altimeter with an interference prevention system, the radar altimeter comprising:
at least one antenna to transmit and receive frequency modulated signals
a transmitter in communication with the at least one antenna;
a receiver in communication with the at least one antenna;
a signal processor in communication with the receiver, the signal processor configured to process received signal to determine ranging information; and
a signal generator configured to generate the frequency modulated signals, the signal generator in communication with the at least one transmitter, the signal generator including,
at least one pseudorandom noise sequence generator configured to generate integer values from a fixed time base signal,
at least one memory configured to store at least one of start frequencies and stop frequencies,
a frequency synthesizer configured to generate frequency modulated continuous wave (FMCW) ramps in transmit frames of the frequency modulated signal, and
at least one controller configured to use the generated integer values from the at least one pseudorandom noise sequence generator as indexes into start frequencies stored in the at least one memory, the controller further configured to use a start frequency of a next transmit frame as a stop frequency wherein the at least one pseudorandom noise sequence generator is clocked one frame ahead of the frequency synthesizer so that the start and stop frequency may be configured at the beginning of each frame.

8. The radar altimeter of claim 7, wherein the at least one controller is at least one field-programmable gate array (FPGA).

9. The radar altimeter of claim 8, wherein the at least one memory is at least one register of the FPGA.

10. The radar altimeter of claim 7, wherein each pseudorandom noise sequence generator has its own feedback polynomial and seed value.

11. The radar altimeter of claim 7, wherein each pseudorandom noise sequence generator is configured to output a maximum length sequence.

12. The radar altimeter of claim 7, wherein the at least one pseudorandom noise sequence generator further comprises:
three pseudorandom noise sequence generators, the controller configured to combine the outputs of the three pseudorandom noise sequence generators to determine the integer value that is used as the index into the frequency table.

13. The radar altimeter of claim 7, wherein the at least one of start frequencies and stop frequencies stored in the at least one memory are stored in a low frequency table that includes down ramp stop frequencies and a high frequency table that includes up ramp stop frequencies.

14. A method of operating an interference prevention system in a radar altimeter, the method comprising:
generating integer values with at least one pseudorandom noise sequence generator;
using the generated integer values as indexes to select start frequencies from at least one frequency table for frequency modulated continuous wave (FMCW) ramps for a generated radar signal;
providing the selected start frequencies to a frequency synthesizer; and
using a start frequency of a next transmit frame as a stop frequency wherein the at least one pseudorandom noise sequence generator is clocked one frame ahead of the frequency synthesizer so that the start and stop frequency may be configured at the beginning of each frame.

15. The method of claim 14, further comprising:
determining a ramp direction for a current transmit frame;
using a down ramp stop frequency from the at least one frequency table when the direction of the ramp in the current transmit frame is down; and
using an up ramp stop frequency from the at least one frequency table when the direction of the ramp in the current transmit frame is up.

16. The method of claim 14, further comprising:
maintaining the frequency of the generated radar signal at the stop frequency of the current transmit frame after a completion of a frequency ramp for a remainder of a fixed transmit frame time.

17. The method of claim 14, further comprising:
fixing a ramp rate of the frequency modulated continuous wave (FMCW) ramps.

18. The method of claim 14, wherein generating integer values with at least one pseudorandom noise sequence generator further comprises:
generating each integer value with three pseudorandom noise sequence generators.

* * * * *